US007045193B2

(12) United States Patent
Tanel et al.

(10) Patent No.: US 7,045,193 B2
(45) Date of Patent: May 16, 2006

(54) DISPLAY MAT WITH HIGH-DEFINITION GRAPHICS

(75) Inventors: Michael L. Tanel, 119 N. 92nd St., Milwaukee, WI (US) 53226-4527; Ronald P. Davis, Waterford, WI (US)

(73) Assignee: Michael L. Tanel, Milwaulkee, WI (US)

( * ) Notice: Subject to any disclaimer, the term of this patent is extended or adjusted under 35 U.S.C. 154(b) by 0 days.

(21) Appl. No.: 10/206,692

(22) Filed: Jul. 26, 2002

(65) Prior Publication Data

US 2002/0187315 A1 Dec. 12, 2002

Related U.S. Application Data

(63) Continuation-in-part of application No. 09/750,901, filed on Dec. 27, 2000, now abandoned.

(51) Int. Cl.
*D06N 7/00* (2006.01)
*B32B 5/16* (2006.01)
*A47G 35/00* (2006.01)

(52) U.S. Cl. .................. 428/142; 428/195.1; 428/323; 428/542.2; 428/542.6

(58) Field of Classification Search ................ 428/131, 428/142, 143, 195, 195.1, 542.2, 542.6, 323
See application file for complete search history.

(56) References Cited

U.S. PATENT DOCUMENTS 5,049,431 A 9/1991 Heckel et al. .............. 156/252
5,304,272 A 4/1994 Rohrbacker et al. ........ 156/209
5,468,532 A 11/1995 Ho et al.
5,547,741 A * 8/1996 Wilson ....................... 428/215
5,667,873 A 9/1997 Beckenbach ................ 428/141
6,013,347 A 1/2000 Martin et al. ................. 428/92
6,041,533 A * 3/2000 Lemmond, Jr. .............. 40/584
6,103,352 A * 8/2000 Takahashi ................ 428/195.1
6,159,583 A 12/2000 Calkins ...................... 428/195
6,180,228 B1 1/2001 Mueller et al. ............. 428/354
6,218,001 B1 * 4/2001 Chen et al. ................. 428/323
6,241,187 B1 * 6/2001 Apel et al. ............... 244/118.5
6,319,592 B1 11/2001 Ney et al. ................... 428/195

OTHER PUBLICATIONS

3M Product Instructions, *Floor Graphics Laminating & Application Procedures,* Instruction Bulletin 5.19 (Feb. 1996).
Catalina Graphic Films, Pressure Sensitive Materials Product Guide.
Cygnus Graphics Network, Modern Reprographics feature story, *Floored by Floor Graphics,* L. Formichelli, http://www.modrepro.com.
Catalina Graphics Films, Main Directory & Services, http://www.catalinagraphicfilms.com.

* cited by examiner

*Primary Examiner*—Harold Pyon
*Assistant Examiner*—Patricia L. Nordmeyer
(74) *Attorney, Agent, or Firm*—Thomas D. Wilhelm; Eric J. Lalor; Wilhelm Law Service

(57) ABSTRACT

The invention involves en improved display mat having high-definition graphics for use on a variety of surfaces including carpet. The display mat is comprised of a flexible polymeric sheeting having top and bottom sides, a high-definition image printed on the top side of the sheeting; and a coating overlying and protecting the image and providing a durable non-slip surface. The display mat has sufficient cohesion between the sheeting, image and coating to withstand repeated rolling and unrolling without separation. In addition, the invention provides a method of constructing a display mat with high-definition graphics.

27 Claims, 6 Drawing Sheets

DISPLAY MAT WITH HIGH-DEFINITION GRAPHICS

RELATED APPLICATIONS

This is a continuation-in-part of patent application Ser. No. 09/750,901 filed on Dec. 27, 2000, now abandoned by the inventors named herein, and currently pending.

FIELD OF THE INVENTION

The invention relates to floor graphics and, more particularly, relates to a mat that is supportable on virtually any pedestrian surface, including carpeting, and that bears printed graphics for advertising purposes or the like. The invention additionally relates to a method of producing such a mat.

DISCUSSION OF THE RELATED ART

Many retail settings have little available wall space to display promotional literature, resulting in fierce competition for that wall space. Faced with this unpleasant reality, advertisers are becoming increasingly aggressive and creative in seeking new techniques to promote their goods or services. One increasingly popular technique is the use of so-called "floor graphics" as a form of promotional literature. Floor graphics are any of a variety of indicia-bearing advertising and informational products configured to be placed in the aisles of a business establishment, just inside or outside the establishment's door, in the establishment's parking lot, or any other pedestrian surface walked over by prospective viewers of the graphics. Floor graphics are gaining popularity because retailers are increasingly coming to realize the floor is prime real estate for ads, promotional messages, and logos. In fact, many advertisers consider the floor to be superior to walls or other locations as a venue for displaying promotional literature because people tend to look down at the floor to see where they are walking and, hence, are more prone to direct their attention to promotional literature on the floor than the same literature on the walls or elsewhere. This is particularly true when the floor graphics are placed in bottlenecks within or near a retail establishment such as just inside or outside of the establishment's entrance/exit.

However, designers of floor graphics face challenges not faced by designers of wall graphics. Unlike wall graphics, floor graphics are subject to substantial scuffing and soiling potential as passerby walk over them. Simple printed paper sheets therefore are not durable enough to be used as floor graphics. The floor graphics also may be mounted on the floor so as to remain in place while people walk over them. Otherwise, they might shift under the feet of the customer. The surface of the floor graphics also should not be unnecessarily slippery, particularly if the graphics are used in an outdoor environment or in another location in which they may become wet.

Most currently available floor graphics comprise a vinyl sheet glued or otherwise adhered with respect to a rigid surface such as a tiled floor. The graphics may be printed directly onto the sheet, however, because many printing operations must be performed on a relatively thin, flexible sheets, the typical directly printed sheet lacks sufficient bulk and dimensional stability to be placed on the floor without first fastening the sheet to a substrate to increase thickness. This adds another step in the manufacturing process and increases costs. Typically, the sheet is adhered to a rubber substrate, which is significantly more expensive than vinyl, to provide sufficient strength for floor mounting. The sheet is typically covered with a slip-resistant over laminate that provides a non-slip surface for passerby walking over the sheet. Vinyl is typically the material of choice for the floor-mounted sheet material because it is relatively scuff-resistant, slip-proof, waterproof, and washable. Thin vinyl sheets can be printed on with high quality, full-color graphics using any of a variety of printing techniques.

One potential solution to the problems and expenses associated with the additional step of fastening the thin printed vinyl sheet to a substrate is to increase the thickness of the vinyl sheet, to place the graphics on such thick vinyl sheet which, after printing, and protecting the printing, can simply be dropped onto a floor or other pedestrian surface like any conventional floor mat. A mat of this type can be placed in any desired location without requiring the additional backing layer used in the prior art. However, attempts in the prior art to print graphics directly on thick "single-layer" floor mats (mats having only a single preformed layer) have met with only limited success because the quality of graphics on thick single-layer mats has tended to be very poor, rendering the mats poorly suited for use in most advertising applications. Therefore, prior art mats which have utilized high-definition printing systems such as four-color process printing, digital printing or lithography have necessarily been formed from two layers—typically a rubber substrate suitable for structural use as a mat and a thin upper layer formed from a printed sheet of vinyl or another material suitable for use as a display graphic.

Because vinyl does not adhere well to rubber it typically must be vulcanized to rubber in order to provide sufficient connection therebetween. However, the thin vinyl sheet still tends to separate from the rubber substrate, particularly if the mat is folded or rolled for storage. In addition, in the vulcanization process it is very difficult to prevent air bubbles from forming between the sheet and the substrate, resulting in an unsightly appearance in the finished mat. Therefore, there is a need for a high-definition graphic display mat which does not suffer the problems associated with the prior art mats.

Furthermore, to be effective in providing floor graphics, a mat cannot impede pedestrian traffic. Traffic can be impeded when the mat separates from the floor, either at its edges or in the area surrounding the contact point between the mat and a pedestrian's foot. For instance, when a mat has insufficient stiffness, strength or hardness it will "bubble" around a pedestrian's foot. This effect is exacerbated when the mat is used above a soft surface such as carpeting, grass, sand, etc. If a mat separates from the floor, pedestrians may trip and fall when passing over the mat.

At the same time a mat which is too stiff or strong typically will not unroll when being installed such that the edges of the mat stick up from the ground surface. To avoid this problem, the mat may be transported, delivered and installed without being wound into a roll. However, this increases the difficulty of transport and installation.

The need therefore has arisen to provide a reusable, floor mounted display mat that can be mounted on a floor or other pedestrian surface and walked upon. The need has also arisen to provide a display mat that does not require the adhesion of an indicia-bearing sheet of the mat onto an underlying substrate.

The need has also arisen to provide a high-definition single-layer display mat. The need has also arisen to provide a simplified method of displaying information or promotional indicia in a high-definition manner on a floor or other ground surface.

SUMMARY OF THE INVENTION

The invention involves an improved display mat having high-definition graphics for use on a variety of surfaces including carpet. The display mat is comprised of a flexible polymeric sheeting having top and bottom sides and a thickness of at least about 0.07 inches, a high-definition image printed on the top side of the sheeting using four-color process printing; and a coating overlying and protecting the image and providing a durable non-slip surface. The display mat has sufficient flexibility and defines a cohesive structure having sufficient cohesion among the sheeting, image and coating to withstand repeated rolling and unrolling without separation. In addition, the mat has sufficient strength and stiffness to lie flat on a compressible pedestrian surface, such as a carpet, while supporting the weight of people standing on the mat. The mat preferably does not sink into the carpet when people stand on the mat. It is most preferred that the mat have a thickness of at least about 0.09 inches.

In a preferred embodiment, the mat has a durometer hardness of at least about 75 Shore A in accordance with ASTM D 2240, and a peak stress of about 650 psi. The peak stress was measured with a peak load of about 35 lbs in accordance with ASTM D 638. The mat experiences about 122% strain at peak load. Such properties are indicative of a strong, stiff mat which retains sufficient flexibility to endure rolling and unrolling and being stored in roll-form. In addition, the mat's strength and stiffness are sufficient to perform well as a walking surface, even when laid down on soft surfaces such as carpet, grass, sand, etc.

In addition, the display mat preferably exhibits substantially no migration of the ink into the sheeting such that there is no visual defect in the image, i.e., the image remains on the sheeting in high-definition as originally printed thereon. Migration of the ink into the sheeting often affects prior art mats which use images printed on vinyl. While migration is acceptable in certain low-definition images it is not accepted by those who demand high-definition images. Therefore, the ability of the inks to remain as initially printed on the vinyl provides the ability to offer high-definition images. High-definition images are those "photographic quality" images which must typically be printed by four color process printing, digital printing or lithography.

The display mat preferably has only one preformed layer which is the sheeting. Therefore, the display mat has no distinct layers which contact at interfaces where separation can occur during rolling and unrolling. The sheeting is preferably vinyl. The coating is preferably urethane and may include a layer of grit, preferably aluminum oxide, to provide increased traction. The grit may also be crushed glass, glass beads, ceramics or polystyrene. The coating may include a bottom coat and a top coat with the grit positioned therebetween.

The invention may also be described as a display mat having high-definition graphics for use on a variety of surfaces which comprises a flexible polymeric sheeting having top and bottom sides and a thickness of at least about 0.07 inches, a high-definition image printed on the top side of the sheeting, the image printed using four-color process printing, and a coating overlying the image to protect the image and to provide a durable non-slip surface. The mat preferably has sufficient flexibility and there is sufficient cohesion between the sheeting, image and coating to withstand repeated rolling and unrolling without separation. In addition, the mat preferably has sufficient strength and stiffness to lay flat on a surface while supporting the weight of people standing on the mat.

The invention also includes a method of manufacturing a flexible display mat having an image thereon which comprises the steps of printing an image onto a top side of flexible polymeric sheeting using four color process printing, and applying a coating to the image. In such a method, the mat preferably has a thickness of at least about 0.07 inches. The mat preferably has sufficient flexibility and there is sufficient cohesion between the sheeting, image and coating to avoid separation due to pedestrian traffic thereon and repeated rolling and unrolling thereof. The sheeting is preferably vinyl and the mat most preferably has a thickness of at least about 0.09 inches.

In the preferred method the printing step is performed using UV ink and the method further comprises the step of drying the ink using UV light. In the preferred method the coating is urethane which is applied as a liquid to the image. The coating is preferably moisture cured to the image. An alternate embodiment of the preferred method further comprises the step of covering the coating with grit which may be aluminum oxide. Such an alternate embodiment preferably comprises the additional step of applying a topcoat over the grit.

In accordance with a first aspect of the an alternative embodiment of the invention, a printed display mat is provided that includes a polymeric substrate and a polymeric sheet. The substrate has 1) a lower surface adapted to rest on a pedestrian surface and 2) an upper surface. The sheet has 1) a lower surface fused to the upper surface of the substrate and 2) an upper surface. The sheet has display indicia printed thereon which is visible from above the upper surface of the sheet. Because the bottom surface of the sheet is fused to the upper surface of the substrate rather than being glued or otherwise less securely fixed to it, the graphics on the mat are of extremely high quality, and the mat can be handled, folded, or rolled without the layers separating. The finished display mat can be laid directly on carpet, concrete, tile, dirt, or any other pedestrian surface. It can also removed simply by picking it up. It can then be reused.

The graphics may be printed on the upper surface of the sheet, or even on the lower surface (if the sheet is transparent or semi-transparent). If the graphics are applied to the upper surface of the sheet, the sheet preferably is covered with a layer of a protective coating to prevent the graphics from being scuffed or soiled. The upper surface of the sheet may also be roughened, e.g., by imbedding grit in the protective coating, to provide a non-slip surface.

In accordance with another aspect of the alternative embodiment of the invention, an air-permeable vinyl sheet is provided that has a lower surface configured to be fused to an upper surface of a rubber substrate by vulcanization of the rubber. The sheet has display indicia printed thereon which is visible from above the upper surface of the sheet.

In accordance with still another aspect of the alternative embodiment of the invention, a method of forming a printed display mat comprises printing display indicia on a polymeric sheet which has a lower surface and an upper surface, and fusing the lower surface of the sheet on an upper surface of a polymeric substrate to form a multi-layer display mat. The substrate may be formed from rubber, in which case the fusing step advantageously comprises vulcanizing the rubber with the sheet in contact with the substrate, thereby fusing the sheet to the substrate. The display indicia may be printed on either the upper or lower surface of the sheet. If it is printed on the upper surface, an additional step preferably comprises coating the upper surface of the sheet with a protective layer.

In accordance with yet another aspect of the alternative embodiment of the invention, a novel method of using a reusable, walk-on, printed display mat is provided. The display mat includes a polymeric substrate which has a) a lower surface adapted to rest on a pedestrian surface and b) an upper surface; and c) a polymeric sheet which has 1) a lower surface fused to the upper surface of the substrate and ii) an upper surface. The sheet has display indicia printed thereon which is visible from above the upper surface of the sheet. The method includes laying the mat on the ground, and then removing and reusing the mat.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings.

DETAILED DESCRIPTION OF THE PREFERRED EMBODIMENTS

Figure 8:
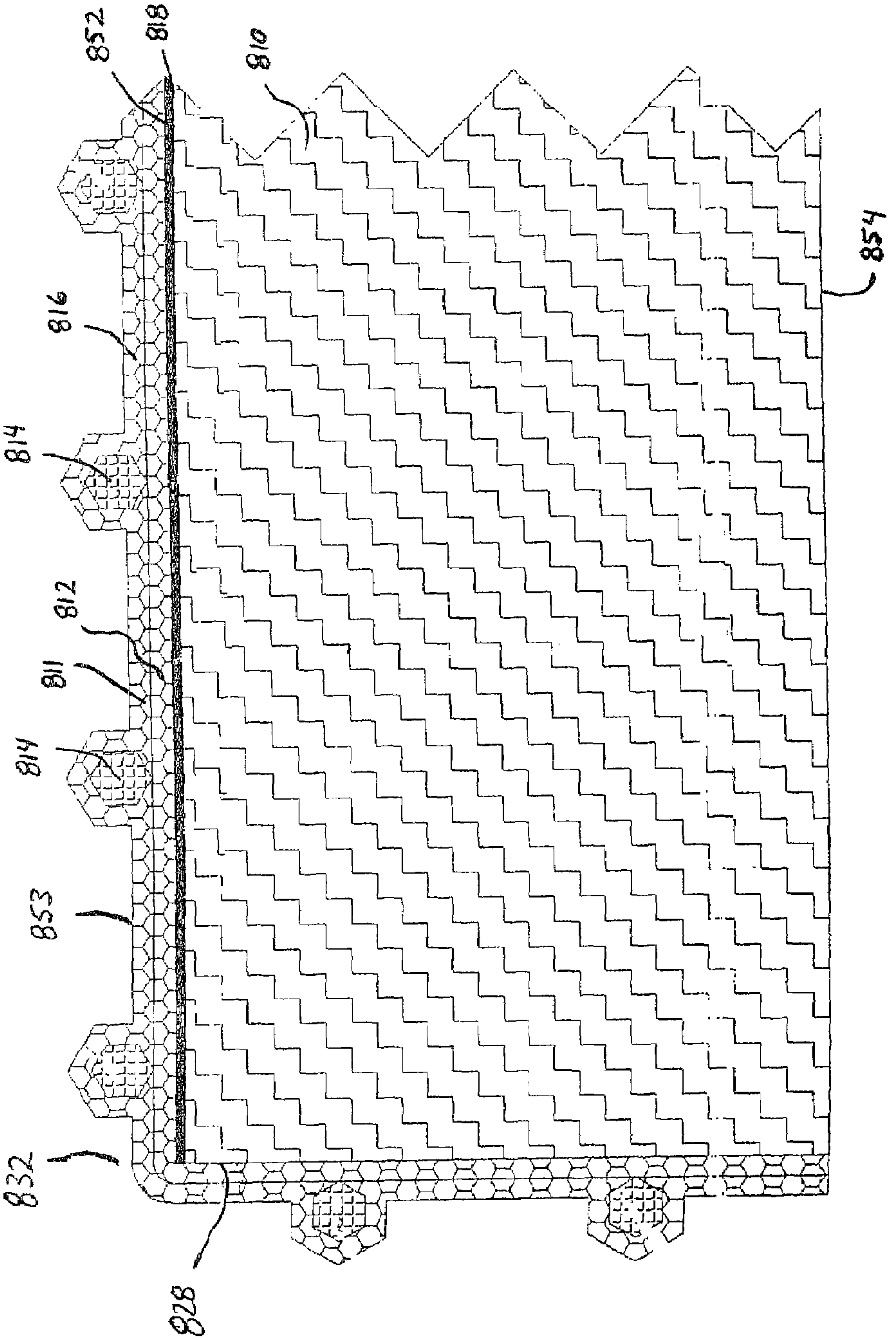
FIG. 8 is a cross section view of the preferred display mat in accordance with the invention.
Figure 9:
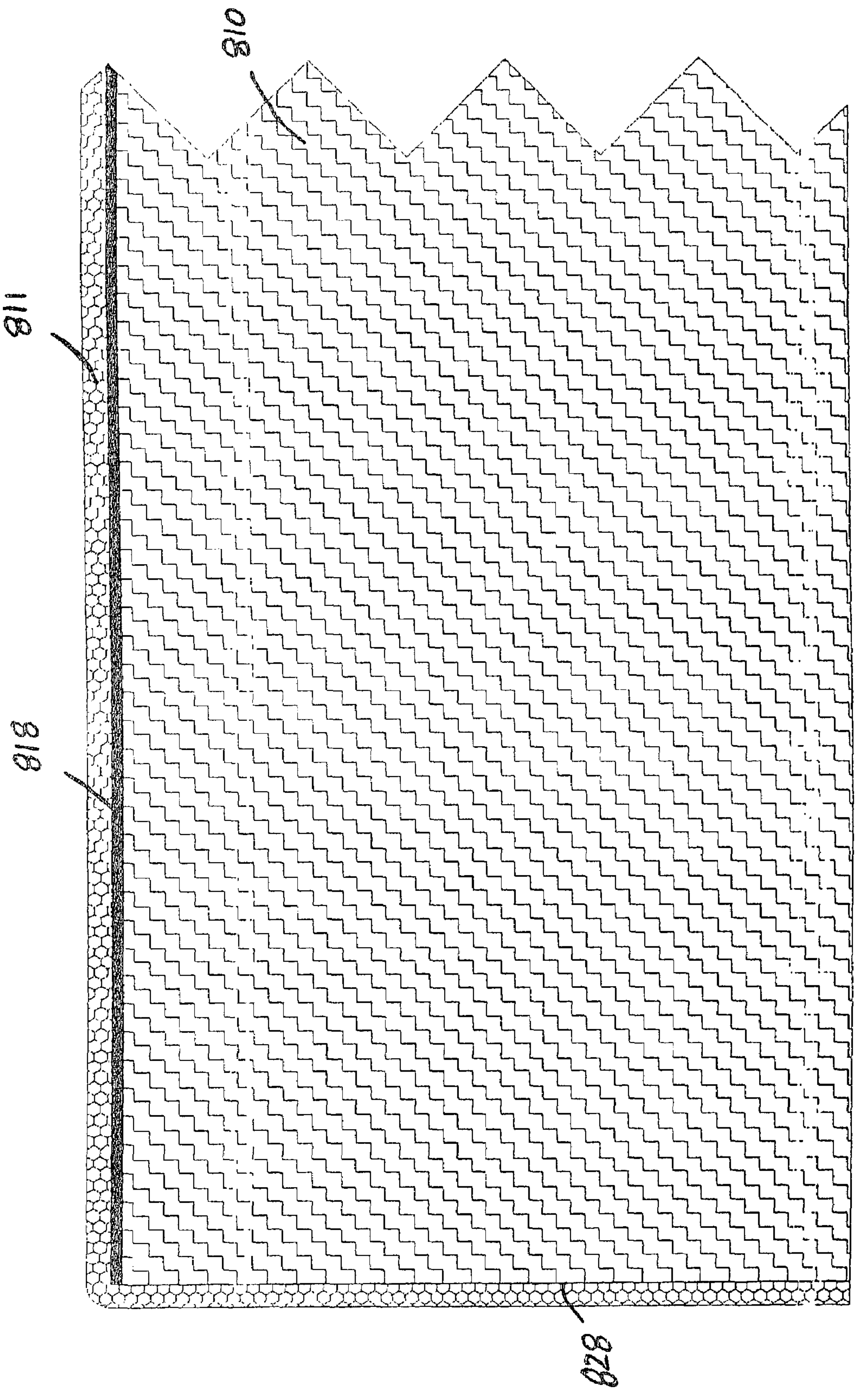
FIG. 9 is a cross section view of the preferred display mat in accordance with the invention.

FIGS. 8 and 9 are cross section views of the preferred display mat 832. Mat 832 includes a flexible polymeric sheeting 810 having top and bottom sides 852, 854. Sheeting 810 preferably has a thickness of at least about 0.07 inches. A high-definition image 818 is printed onto top side 852 using four-color process printing as is known for use on thin substrates such as paper. High-definition images are known in the art to be substantially similar to photographic images, especially when viewed from a distance. Four-color process printing and digital printing are typically acknowledged as the accepted methods of preparing such high-definition images on large areas such as posters. Lithography also allows for high definition printing.

A coating 811 overlies image 818 to offer protection and to provide a durable non-slip surface 853. There is sufficient cohesion between sheeting 810, image 818 and coating 811 to withstand repeated rolling and unrolling of mat 810 without separation. Mat 810 also has sufficient stiffness and strength to lay flat on a carpet while supporting the weight of people standing thereon.

Sheeting 810 is preferably vinyl which includes Diisononyl Phthalate (DINP) plasticizer in an amount sufficient that the display mat can be rolled up, but wherein the amount of DINP is not so great as to cause migration of ink into the sheeting when the ink is applied to topside 852. Sheeting 810, and thus mat 832, can be stored in a rolled up position without damage. Sheeting 810 is heat and light stabilized such that sheeting 810 is not damaged by exposure to typical heat and light encountered in normal use. In addition, sheeting 810 is preferably pigmented to provide a desired color upon which to print an image. Sheeting 810 preferably has a density of about 90 pounds per cubic foot.

Bottom side 854 has a high enough coefficient of friction to prevent slippage between mat 832 and the underlying ground surface when in use. Bottom side 854 is provided for use with ground surfaces such as pavement, carpet, marble, tile, etc. and which may be wet or soiled. In addition, bottom side 854 will not mar or leave residue on a ground surface during typical use.

Image 818 is comprised of inks printing onto topside 852 via four-color process printing. Four-color process printing results in high-definition images which approach photographic quality imaging. The printing process preferably utilizes UV inks which are dried by UV light after printing. However, solvent and water-based inks may also be used. Image 818 preferably has a thickness of substantially less than 1 mil. Because image 818 is directly printed onto sheeting 810 and is so thin, there is reduced strain between image 818 and sheeting 810 when mat 832 is rolled up. This allows frequent or repeated rolling up of mat 832 without damage to image 818 such as cracking or separation between components within mat 832.

In FIG. 8 coating 811 includes a bottom coat 812 which is applied directly to image 818. Grit 814 is positioned on bottom coat 812 before top coat 816 is applied over grit 814 and bottom coat 812. Grit 814 provides increased traction between the mat and pedestrian traffic, especially when mat 832 is wet. Bottom coat 812 and top coat 816 are preferably urethane which is non-slip and provides sufficient durability such that pedestrian traffic does not scuff, mar or otherwise alter the view of image 818. FIG. 9 depicts the invention in which coating 811 is a single urethane layer which is applied directly to image 818.

Coating 811 is flexible such that rolling and unrolling mat 832 does not cause it to break or separate from image 818 or sheeting 810. As shown in FIGS. 8 and 9, coating 811 may cover image 818 as well as edge 828 of mat 832 to prevent the outside environment from contacting image 818. Coating 811 preferably has a thickness of about 2 mils or less.

As constructed, mat 832 provides a durable medium for high-definition graphics. Mat 832 is flexible enough to be rolled up without being damaged and performs well when being laid down, i.e., the mat lies closely to the contours of the underlying surface quickly without having any edge or corner separating from the underlying surface. In addition, mat 832 has sufficient strength to resist stretching and distortion such that image 818 is not altered during rolling or unrolling nor when weight is applied to the surface of mat 832 (such as when a person walks or stands on mat 832). When used on carpet, mat 832 has sufficient stiffness to support a person without sinking into the carpet or separating from the carpet (bubbling) around the person's feet.

While providing flexibility, mat 832 also provides sufficient hardness or impact resistance to withstand the application of extreme pressures. For instance, a 100 pound women wearing shoes with 0.06 square inch heel surfaces (0.25 in. by 0.25 in.) inflicts a pressure of at least 1,600 pounds per square inch on the mat when her heel strikes. The impact resistance of mat 832 is high enough such that mat 832 is not punctured or otherwise damaged during typical use which might include applications of forces as high as 4,000 pounds per square inch.

Pursuant to an alternative embodiment of the invention, a reusable, walk-on, printed display mat is provided that includes a polymer substrate and a printed sheet that bears indicia such as high-quality graphics. The polymer substrate is capable of being placed on a pedestrian surface such as a floor or the ground and of remaining in position as people walk over it. The sheet is fused to the substrate so as to avoid separation problems that could arise if the sheet were merely glued to the underlying substrate. The sheet preferably is formed from vinyl or another material that can bear very vivid graphics applied by any of a number of high-quality printing techniques. The graphics may be applied either on top of the sheet or, if the sheet is made of a transparent or semi-transparent material, on the bottom of the sheet. Depending, e.g., upon the printing technique used, the thickness of the sheet, and the thickness of the substrate, the graphics may be applied either before or after the sheet is fused to the substrate. The substrate may be formed from rubber, in which case the sheet may be fused to the rubber during a low-pressure vulcanization process. Conversely, the substrate may be made from the same or similar material as the sheet, in which case the sheet and substrate may be fused to one another by combining them when at least one of them is not fully cured and by thereafter curing the previously uncured layer(s).

Figure 1:
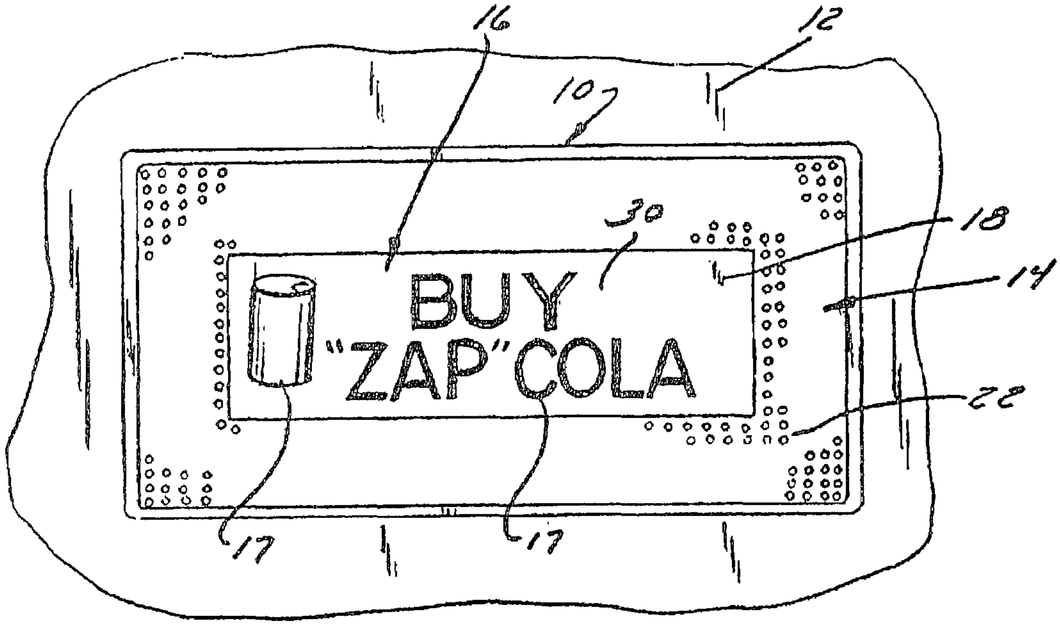
FIG. 1 is a top plan view of a section of a floor bearing a display mat constructed in accordance with a first preferred alternative embodiment of the present invention.

Referring now to the drawings and initially to FIG. 1 in particular, a display mat 10 constructed in accordance with a first preferred embodiment of the invention is shown located on a pedestrian surface 12. The surface 12 may comprise an interior floor, an exterior slab, or any surface that people walk over or near. Because the mat 10 is merely placed on top of the surface 12 rather than being adhered to it, the surface could be formed of virtually any material, including manufactured materials such as concrete, limoneum, asphalt, carpet, in a constructed pedestrian surface/walkway, or even non-manufactured materials such as dirt or grass, as a naturally-occurring, non-constructed surface/walkway. In the embodiment of FIGS. 1–4 in which the display mat 10 is an outdoor mat, the surface likely would be concrete, dirt, or asphalt.

Still referring to FIG. 1, the display mat 10 of the illustrated embodiment is particularly well-adapted for indoor/outdoor use. It includes a rubber substrate 14, a sheet 16, and a protective layer 18 (shown in FIGS. 3 and 4) coated onto the vinyl sheet 16. Indicia in the form of graphics 17 are printed on the sheet 16. The sheet 16 is fused to the substrate 14 as described in more detail below. In the illustrated embodiment, the sheet 16 fills only a center portion 20 (FIGS. 2–4) of an upper surface of the substrate 14 and is surrounded by a border 22 formed entirely of the upper surface of the substrate 14. However, as is the case in the second embodiment discussed in more detail in Section 3 below, the sheet could also completely overlie the substrate.

Figure 2:
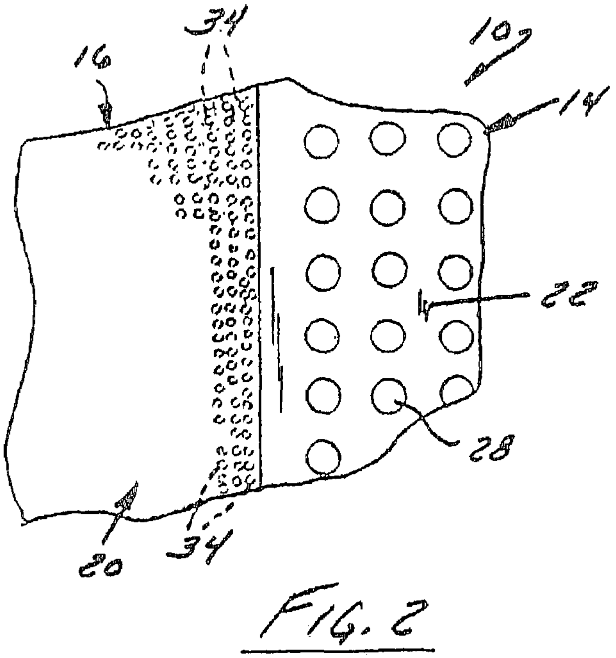
FIG. 2 is a detail view of a portion of the display mat of FIG. 1.
Figure 3:
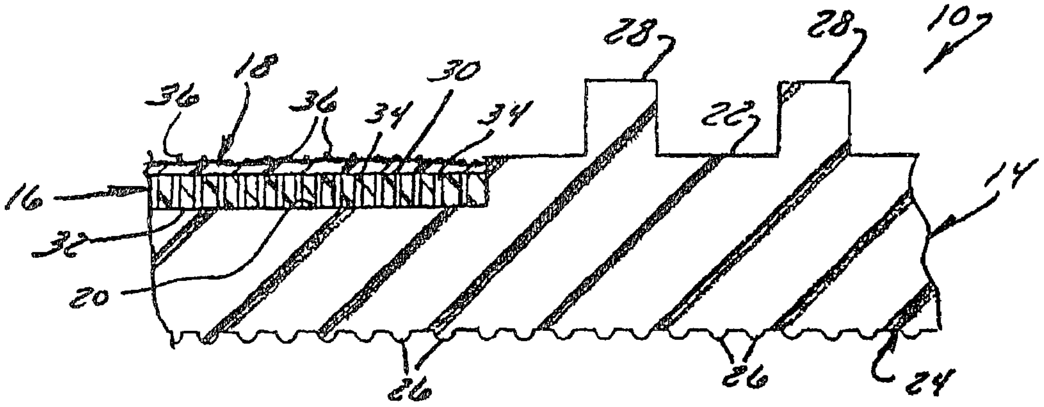
FIG. 3 is a side sectional elevation view of a portion of the display mat.
Figure 4:
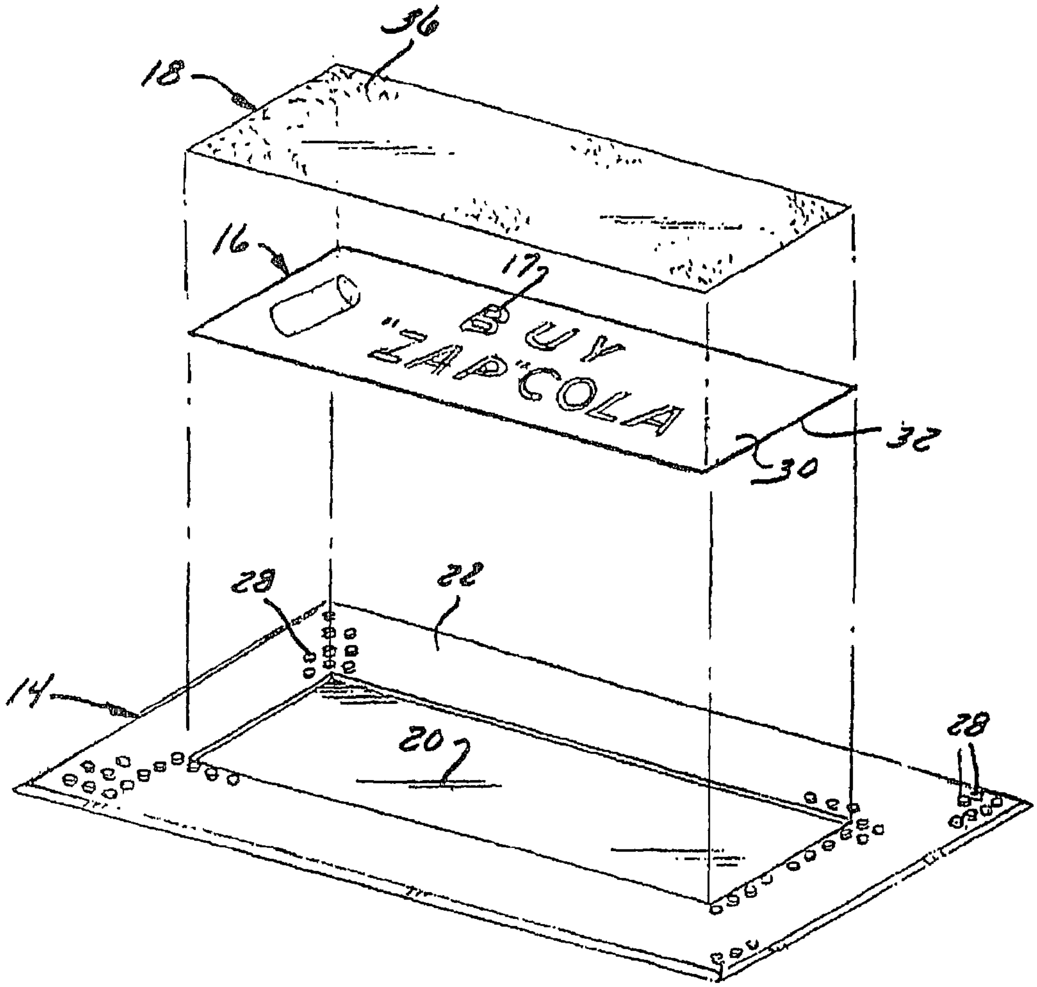
FIG. 4 is an exploded perspective view of the display mat.

Referring to FIGS. 2–4, the substrate 14 has a lower surface 24 configured to rest on the pedestrian surface 12 (seen only in FIG. 1) and an upper surface having at least a portion 20 configured to be fused to the lower surface of the sheet 16. Because the illustrated display mat 10 is configured for use in wet or slippery conditions, the substrate 14 is configured to minimize slippage both between it and the pedestrian surface 12 and between it and the feet of people walking over it. Hence, it is relatively thick to increase its bulk. Both the bottom surfaces 24 and the border 22 on the top surface are also non-planar to reduce hydroplaning potential. The bottom surface 24 has an array of relatively small protrusions 26 that rest against the pedestrian surface 12 and that act as grippers that inhibit slippage between the mat 10 and the pedestrian surface 12. The border 22 of the upper surface has a plurality of relatively large, upwardly facing lugs or grippers 28 around an outer perimeter thereof that are engaged by the feet of passerby walking over it to enhance the non-slip characteristics of the upper surface of the display mat. The grippers 28 would not be required or even desired in many applications. Other materials, such as carpet strips, could also be vulcanized to or otherwise mounted on the border 22. If the display mat 10 were to be configured for use on a carpet, hook and loop fasteners or some other devices could be mounted on the bottom surface 24 to permit removable mounting of the display mat 10 on the carpet.

The substrate 14 could be of any desired thickness. It typically will be at least 0.050" thick to provide the weight and rigidity desired to prevent slipping or rumpling of the mat. While thicknesses above 0.130" would be uncommon in most applications, it is conceivable that mats having a thickness of ¼ inch or more could be used in cushioned mats designed to provide shock absorbency as passerby walk over it. It could also be of any desired area. If the display mat 10 is wider than the width of available rubber strips, two or more adjacent strips of unvulcanized rubber can be butt-joined at their lateral edges prior to vulcanization and even prior to lamination of the sheet 16 to the substrate 14, thereby permitting the production of display mats of virtually any desired width and length.

The substrate 14 may be made from any material capable of being fused to the overlying sheet 16 so as to negate the need to glue the sheet 16 to the substrate 14. Natural or synthetic rubber is currently preferred because it permits a vinyl sheet 16 to be fused to the substrate 14 in a low pressure vulcanization process as described in Section 4 below. However, a variety of other materials also could be used. For instance, the substrate 14 could be formed from the same or similar vinyl as the sheet 16, in which case the sheet 16 could be fused to the substrate 14 by pressing the sheet 16 against the substrate 14 before the mating surfaces of one or both of the layers is fully cured and holding them together as the curing process progresses. Other possible materials suitable for use as the substrate 14 include polyester, polyurethane, polypropylene, polyethylene, silicone, various elasticized materials, and many types of polymers, elastomers, and acrylics.

Referring to FIGS. 1–4, the sheet 16 comprises a printed polymer sheet having an upper surface 30 and having a lower surface 32 fused to the upper surface of the substrate 14. The sheet 16 preferably is also air permeable so as to prevent air from being trapped between it and the substrate 14 during the mat manufacturing process. In the illustrated embodiment, the sheet 16 is rendered air permeable by perforating it with an array of relatively small holes 34. The density and sizes of those holed 34 will vary from application to application. However, as a practical matter, the holes 34 should be as small as possible so as to prevent migration of unvulcanized rubber or another uncured substrate material through the holes 34 to the upper surface 30 of the sheet 16. The perforation density can be at least 100, and preferably about 150 or more, holes per square inch. Each hole preferably has a diameter of no more than 0.0001 to 0.0005". The holes 34 preferably are created simply by puncturing the sheet 16—not by removing material from the sheet 16. The holes 34 may not be required at all if the sheet 16 is formed from a naturally air permeable material or if the sheet 16 is mounted on the substrate 14 using a technique that prevents air bubbles from being trapped between it and the substrate 14. For instance, an imperforate sheet could conceivably be laminated to a rubber sheet in a process that forces trapped air from between the layers.

The thickness of the sheet 16 will vary depending upon, inter alia, the desired application and the printing to be employed. The sheet 16 typically will have a thickness of between 0.004" and 0.018" and more typically between 0.008" and 0.010". However, much thicker printed sheets, on the order of 0.050" and even thicker, can be used.

The sheet 16 may be made of a variety of materials that 1) are suitable for having high quality graphics printed on them and 2) are sufficiently durable to be walked upon. Vinyl is preferred because graphics can be printed on it using any of a number of printing techniques. The graphics 17 typically will be applied to the upper surface 30 of the sheet 16. However, if the sheet 16 is transparent or semi-transparent, reverse graphics could be applied to the lower surface 32 of the sheet 16 so that they are visible from above the sheet 16. This latter possibility is attractive in applications in which the graphics are easily scuffed and/or the protective coating 18 is not utilized. It is also possible to print graphics to both surfaces 30 and 32 of the sheet 16.

The graphics 17 may be formed from a variety of water or solvent-based paints, inks, dyes, or pigments. For example, they may be applied by ink jet printing, laser printing, brush painting, pen writing, electrostatic printing, screen printing, litho-printing, photographic printing, holographic printing, die sublimation, or lenticular printing. The preferred printing technique will vary depending upon the type of sheet, the type of graphics material used, and the stage at which the graphics are applied during the mat production process. Hence, offset printing will work perfectly well if the sheet is a relatively thin, flexible sheet capable of being subjected to an offset printing process and if the graphics 17 are printed onto the sheet 16 prior to its fusion to the rubber substrate 14.

Referring now to FIG. 3, the protective coating 18 covers the entire upper surface 30 of the sheet 16, thereby protecting the printed graphics 17 and the material of the sheet itself from scuffs and soiling. The coating 18 is relatively thin and, in fact, need only be thick enough to adequately protect the underlying vinyl sheet.

Thicknesses of 0.001" to 0.010" are typical, with a thickness of about 0.002" to 0.004" being preferred. Any of a variety of semi-transparent or generally transparent materials can be used as the coating. Suitable materials include vinyl, rubber, nylon, polyurethane, silicone, PVC, PVC plastisol, acrylic, or any variety of elasticized materials.

A layer of grit 36 is embedded in the coating 18 to increase the coefficient of friction of the coated sheet by reducing the planarity of its upper surface. The grit 36 preferably is encapsulated by the coating 18, e.g., by depositing it between two layers of the coating as described in Section 4 below. The grit 36 may be of any suitable size, density, and material. Suitable grit materials include, aluminum oxide, glass, diamond, metal chips, sale, or ceramics.

In use, the display mat 10 of FIGS. 1–4 is simply carried to a desired location and dropped in place on the pedestrian surface 12. There is no need to glue or otherwise affix the mat 10 to the surface 12. Once placed at the desired location, the mat 10 remains in that location without slipping or crumpling as passersby walk over it. The protective coating 18 prevents the printed graphics 17 on the sheet 16 from becoming scuffed or soiled, and the grit 36 embedded in the coating 18 prevents the sheet 16 from becoming slippery if it gets wet. The display mat 10 can be removed simply by picking it up—no special tools or equipment are required. Once removed, it can be rolled, folded, or stored flat and reused upon demand.

Figure 5:
FIG. 5 is a top plan view of a display mat constructed in accordance with a second preferred alternative embodiment of the invention.
Figure 6:
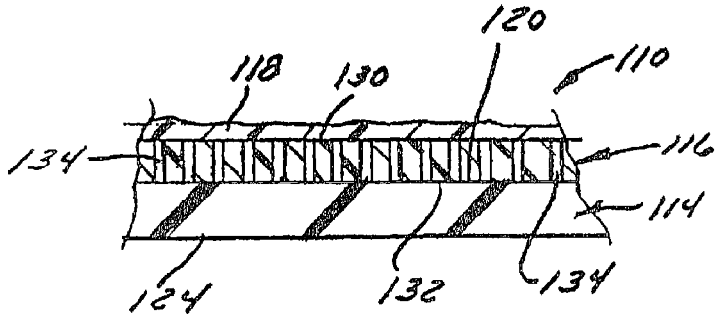
FIG. 6 is a side sectional elevation view of a portion of the display mat of FIG. 5.

Referring now to FIGS. 5 and 6, a display mat 110 constructed in accordance with a second embodiment of the invention is illustrated. The display mat 110 differs from the display mat 10 of the first embodiment in that it is configured primarily for indoor use rather than for outdoor use. It nevertheless contains the remaining major components of the mat of the first embodiment, which are designated by the same reference numerals as the corresponding components of the first embodiment, incremented by 100. The display mat 110 therefore, includes a rubber substrate 14, a vinyl sheet 116, and a layer of protective polyurethane coating 118. As in the first embodiment, the substrate 114 has upper and lower surfaces 120 and 124 and is fused to the sheet 116 and is supported on a floor or other pedestrian surface, respectively. The sheet 116 has an upper surface 130 coated with a protective coating 118 and a lower surface 132 fused to the upper surface 120 of the substrate 114. The sheet 116 may also be perforated with holes 134 to prevent air from being trapped between it and the substrate 114 during the mat production process.

There are notable differences between the display mat 110 and the display mat 10 of the first embodiment. For instance, the sheet 116 and substrate 114 of this embodiment are of equal area so that the sheet 116 completely overlies the upper surface 120 of the substrate 114. Because slippage is of less of a concern than with the first embodiment, the rubber substrate 114 is thinner and has a smoother bottom surface 124 than the substrate of the first embodiment, providing a mat 110 that is of reduced overall thickness when compared to the mat 10 of the first embodiment. As discussed above, grit and/or a clear coating could be applied to the bottom surface 124, if desired, to enhance the floor-gripping ability of the substrate 114. The grit is also eliminated from the coating 118.

Figure 7:
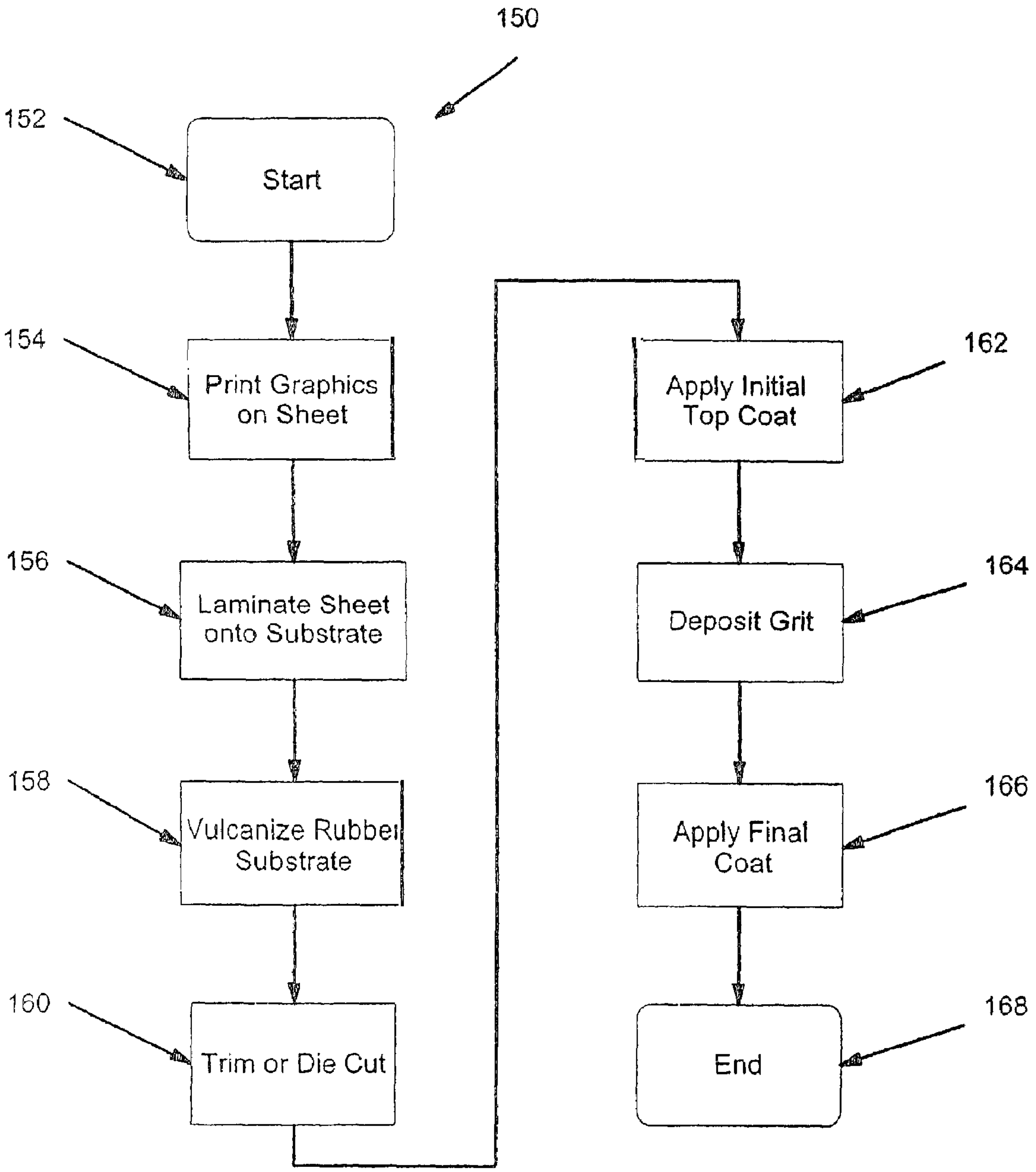
FIG. 7 is a flowchart of a preferred process for constructing a display mat in conformance with an alternative embodiment of the present invention.

As discussed above, a display may can be produced in any of the variety of processes that results in fusing of the printed sheet to the underlying substrate. The process employed will vary with, inter alia, the properties of the materials used in the substrate and the printed sheet. Referring now to FIG. 7, a possible process 150 of producing the display mat 10 of FIGS. 1–4 is illustrated. The process 150 proceeds from Start in Block 152 to Block 154, where graphics 17 are printed on the sheet 16 using one or more of the printing techniques described in Section 2 above. Also as described above, the graphics 17 can be printed on either the upper surface 30 or the lower surface 32 of the sheet 16. If the sheet 16 is to be perforated to render it air permeable, then the printing step preferably will occur after the sheet 16 is perforated, although not necessarily before the sheet is stacked onto the substrate 14. The graphics 17 could also be applied after the sheet 16 is fused to the substrate 14, provided that 1) the graphics 17 are applied to the upper surface 30 of the sheet 16, and 2) the printing technique is compatible with a relatively thick two-component mat 10.

Next, in Block 156, the sheet 16 is stacked on top of the substrate 14 and preferably laminated to the substrate 14 to force air from between the two layers 14 and 16. The sheet 16 may be laminated to the substrate 14 by feeding it through a heated nip formed between two rollers having a nip pressure of about 35 psi and an outer surface temperature of about 150° F. Lamination in this manner not only forces the air from between the layers 14 and 16, but renders the material of one or both layers sufficiently tacky to hold them together during the subsequent handling and vulcanization processes. It should be noted that this laminating step might not be required if the vinyl sheet 16 is sufficiently perforated or air permeable to permit air to easily bleed from between the layers 14 and 16 when the vinyl sheet 16 is laid on top of the rubber substrate 14. Conversely, lamination negates the need to use a perforated or otherwise air permeable sheet in the display mat 16. Hence, the choice of whether to include a lamination step in a particular process will depend on manufacturer preference and/or the properties of the sheet 16.

Next, in step 158, the rubber substrate 14 is vulcanized with the vinyl sheet 16 on it so as to fuse the bottom surface 32 of the vinyl sheet 16 to the upper surface 20 of the rubber substrate 14. In the preferred process, the laminated sheet/substrate combination is placed in a mold and heated for a period of time and at a pressure that is sufficient to cure the rubber and to fuse the sheet 16 to substrate 14. Suitable temperature ranges, pressure ranges, and dwell times may vary from application to application. For instance, because some inks begin to break down at temperatures above 300° F. to 400° F., maximum temperatures should be limited to about 400° F. in applications in which heat-sensitive ink is printed on the sheet 16 prior to vulcanization. However, higher temperatures may be utilized in applications with more stable ink or in which the ink is printed onto the sheet 16 after vulcanization is complete. As a practical matter, the vulcanization process will typically take place at temperatures between 150° F. and 400° F., pressures between 10 psi and 2000 psi, and dwell times of between 2 minutes and 20 minutes. Any of a variety of presses and molds are suitable for this process. A so-called "flexible cavity press" having an interior of flexible periphery is preferred because mats of different shapes, sizes, and thicknesses can be accommodated by the same mold. Flexible cavity presses are well known to those skilled in the Vulcanization art.

It may also be possible to roughen the upper surface 30 of the sheet 16 sufficiently during the vulcanization process to eliminate the need to apply grit 36 on that surface. This process would entail vulcanizing the rubber at a temperature at or above the softening point of the vinyl material (typically between 300° F. and 400° F.) in a cavity having an upper surface that is sufficiently textured to emboss a corresponding textured surface onto the sheet 16 during the vulcanization process. The embossed surface is sufficiently rough after the softened sheet hardens to negate the need for a grit layer on top of the sheet 16.

As a result of the vulcanization process, the bottom surface 32 of the sheet 16 is fused to the upper surface 20 of the rubber substrate 14 along at least substantially the entire contact area thereof. The resultant layered mat 10 can be bent, rolled, or otherwise manipulated without the layers 14 and 16 separating The result is a durable, reusable mat 10. It has also been found that, as the layers 14 and 16 cool following the vulcanization process, the rubber substrate 14 shrinks at a slightly faster rate than the vinyl sheet 16, resulting in a slight downward curl or taper along the entire perimeter of the display mat 10 that decreases the possibility that passerby will trip over the mat 10.

After the vulcanization process is complete, the edges of the resultant display mat 10 are trimmed or die cut to size in Block 160. Then, in Block 162, an initial layer of the protective coating 18 is applied over the upper surface 30 of the sheet 16, and the grit 36 is deposited on the coating 18 in Block 164. The polyurethane coating "bites" or defuses into the upper surface 30 of the printed vinyl sheet 16 at this time, hindering or preventing separation of the coating 18 from the sheet 16. Finally, a second layer of the protective coating 28 is applied over the grit 36 in Block 166 to encapsulate the grit 36 in the protective coating 18, and the process proceeds to End in Block 168. As mentioned above, the coating 28 is not required in all applications and could be applied as a separate sheet as opposed to a liquid coating. If the coating is applied as a sheet, it could be either laminated (glued) to the sheet 16 or fused to it during the vulcanization step.

The protective coating 18, like the remaining components of the display mat 10, is highly flexible, permitting the mat 10 to be bent and rolled without cracking. The coating layers 18 may be applied in a number of ways such as through high volume, low pressure spraying, aerosol spraying, electrostatic coating, brush coating, curtain undercoating, reciprocating coating, etc. The grit layer 36 could be applied by broadcast spreading, drop spreading, sandblasting, etc. It could also be mixed in the coating material before application of the coating to the sheet 16. The number of coating layers applied can vary from application to application as desired. In fact, for indoor and other applications lacking grit or in applications in which the grit is mixed with the coating material prior to application, a single coating layer should suffice in many instances.

Many changes and modifications may be made to the invention in addition to those discussed above without departing from the spirit thereof.

The scope of other changes will become apparent from the appended claims.

The invention claimed is:

1. A floor mat, for a pedestrian surface, comprising:

(a) a flexible polymeric sheet having a top side;

(b) an image, comprising ink applied directly onto the top side of said polymeric sheet; and (c) a polymeric coating, applied to and penetrating said polymeric sheet and said image, providing a durable outer surface of said floor mat said floor mat defining a structure wherein said polymeric coating is diffused into the top side of said image and said polymeric sheet.

2. A floor mat as in claim 1 wherein the image exhibits substantially no migration into said sheet.

3. A floor mat as in claim 1 wherein said floor mat does not sink into a carpet when said display mat is laid down on such carpet and people stand on said display mat.

4. A floor mat as in claim 1 wherein said floor mat has a thickness of at least about 0.07 inch.

5. A floor mat as in claim 1 wherein said sheet comprises vinyl polymer.

6. A floor mat as in claim 1 wherein said polymeric coating (18) comprises urethane.

7. A floor mat as in claim 1 wherein said floor mat has a hardness of at least about Shore A durometer 75 and a peak stress of about 650 psi.

8. A floor mat as in claim 1, said floor mat further having sufficient flexibility to withstand repeated rolling and unrolling of said floor mat without damage to said floor mat, including without separation between said polymeric sheet and said polymeric coating.

9. An information display area, comprising:

(a) a constructed pedestrian walkway; and (b) a floor mat, said floor mat generally horizontally overlying said constructed pedestrian walkway, and comprising (i) a flexible polymeric sheet having a top side, (ii) an image, comprising ink applied directly to the top side of said polymeric sheet, and (iii) a polymeric coating applied to and penetrating said polymeric sheet and said image, and providing a durable outer surface of said floor mat, and said floor mat defining a structure wherein said polymeric coating is diffused into the top side of said image and said polymeric sheet with portions of said ink, said polymeric sheet, and said polymeric coating, generally defining a cohesively bound unitary body as a portion of said floor mat.

10. An information display as in claim 9, said image having a thickness of less than 0.001 inch, and said polymeric coating having a thickness of 0.002 inch or less.

11. An information display as in claim 9, said floor mat having impact resistance high enough that said floor mat, when lying on a constructed pedestrian surface, is not damaged during typical pedestrian use upon application of 1600 pounds per square inch over an area of 0.06 square inch by such pedestrian use.

12. An information display as in claim 9 wherein said polymeric coating comprises urethane.

13. An information display as in claim 9, said flexible polymeric sheet comprising diisononyl phthalate plasticizer in an amount sufficient that said floor mat can be rolled up, but wherein the amount of said diisononyl phthalate is not so great as to enable migration of said ink into said polymeric sheet.

14. A display mat, for a pedestrian surface, comprising:

(a) a flexible polymeric sheet having a top side;

(b) an image, comprising ink applied directly onto the top side of said polymeric sheet; and (c) a polymeric coating, applied to and penetrating said polymeric sheet and said image, providing a durable outer surface of said display mat said polymeric coating being diffused into the top side of said image and said polymeric sheet the image having a thickness of less than 0.001 inch, and said polymeric sheet having a thickness of 0.002 inch or less.

15. A display mat as in claim 14 wherein said polymeric sheet comprises vinyl polymer.

16. A display mat as in claim 14 wherein the image is comprised of ultraviolet ink and wherein the image is dried using ultraviolet light before the polymeric coating (18) is applied to said polymeric sheet.

17. A display mat as in claim 14 wherein the image exhibits substantially no migration into the polymeric sheet.

18. A display mat as in claim 14, said display mat having impact resistance high enough that said display mat, when lying on a constructed pedestrian surface, is not damaged during typical pedestrian use upon application of 1600 pounds per square inch over an area of 0.06 square inch by such pedestrian use.

19. A display mat as in claim 14, said display mat having sufficient flexibility to withstand the combination of pedestrian traffic thereon, and repeated rolling and unrolling of said display mat, without damage to said floor mat, including without separation between said polymeric sheet and said polymeric coating.

20. A floor mat, for a pedestrian surface, consisting essentially of:

(a) a flexible polymeric sheet having a top side;

(b) an image, comprising ink applied directly onto the top side of said sheeting; and (c) a polymeric coating applied to and penetrating said polymeric sheet and providing a durable outer surface of said floor mat; and said image having a thickness of less than 0.001 inch, and said polymeric coating having a thickness of 0.002 inch or less, said floor mat having sufficient flexibility, and sufficient bonding between said polymeric sheet and said polymeric coating to withstand the combination of pedestrian traffic thereon and repeated rolling and unrolling thereof, without separation between said polymeric sheet and said polymeric coating.

21. A floor mat for a pedestrian surface, consisting essentially of:

(a) a flexible polymeric sheet having a top side;

(b) an image, comprising ink applied directly onto the top side of said polymeric sheet; and (c) a polymeric coating, applied to and penetrating said polymeric sheet and said image, diffused into said polymeric sheet, and said image, providing a durable outer surface of said floor mat; and said flexible polymeric sheet comprising diisononyl phthalate plasticizer in an amount sufficient that said floor mat can be rolled up, but wherein the amount of said diisononyl phthalate is not so great as to cause migration of said ink through the entire thickness of said sheet.

22. A floor mat for a pedestrian surface, consisting essentially of:

(a) a flexible polymeric sheet having a top side;

(b) an image, comprising ink applied directly onto the top side of said polymeric sheet; and (c) a polymeric coating applied to and penetrating said polymeric sheet and said image, diffused into said image and said polymeric sheet and providing a durable outer surface of said floor mat; and said floor mat having impact resistance high enough that said floor mat, when lying on a constructed pedestrian surface is not damaged during typical pedestrian use upon application of 1600 pounds per square inch over an area of 0.06 square inch by such pedestrian use.

23. A floor mat, for a pedestrian surface, comprising:

(a) a flexible polymeric sheet having a top side;

(b) an image, comprising ink applied directly onto the top side of said polymeric sheet; and (c) a polymeric coating, applied to and penetrating said polymeric sheet and said image, providing a durable outer surface of said floor mat; and said polymeric coating being diffused into the top side of said image and said polymeric sheet, said image having a thickness of less than 0.001 inch, and said polymeric coating having a thickness of 0.002 inch or less, said floor mat having impact resistance high enough that said floor mat, when lying on a constructed pedestrian surface is not damaged during typical pedestrian use upon application of 1600 pounds per square inch over an area of 0.06 square inch by such pedestrian use.

24. A floor mat as in claim 23, said floor mat having impact resistance high enough that said floor mat, when lying on such constructed pedestrian surface, is not damaged during typical pedestrian use upon application of up to 4000 pounds per square inch over such area of 0.06 square inch by such pedestrian use.

25. A floor mat as in claim 23, said image having a thickness of less than 0.001 inch, and said polymeric coating having a thickness of 0.002 inch or less.

26. A floor mat as in claim 23, said floor mat further having sufficient flexibility to withstand repeated rolling and unrolling of said floor mat without damage to said floor mat, including without separation between said polymeric coating and said polymeric sheet.

27. A floor mat as in claim 23, said flexible polymeric sheet (16) comprising diisononyl phthalate plasticizer in an amount sufficient that said floor mat can be rolled up, but wherein the amount of said diisononyl phthalate is not so great as to enable migration of said ink into said polymeric sheet.

* * * * *